United States Patent
Cimpu et al.

(10) Patent No.: US 11,159,950 B2
(45) Date of Patent: Oct. 26, 2021

(54) METHOD AND APPARATUS FOR DYNAMIC PROTECTION AREA (DPA) PROTECTION

(71) Applicant: Telefonaktiebolaget LM Ericsson (publ), Stockholm (SE)

(72) Inventors: Virgil Cimpu, Ottawa (CA); Kumar Balachandran, Pleasanton, CA (US); Gary Boudreau, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/615,518

(22) PCT Filed: May 24, 2018

(86) PCT No.: PCT/IB2018/053709
§ 371 (c)(1),
(2) Date: Nov. 21, 2019

(87) PCT Pub. No.: WO2018/215974
PCT Pub. Date: Nov. 29, 2018

(65) Prior Publication Data
US 2020/0162929 A1    May 21, 2020

Related U.S. Application Data

(60) Provisional application No. 62/510,280, filed on May 24, 2017.

(51) Int. Cl.
*H04W 16/14* (2009.01)
*H04J 11/00* (2006.01)
*H04W 4/021* (2018.01)
*H04W 16/10* (2009.01)
*H04W 52/36* (2009.01)
*H04W 72/04* (2009.01)
(Continued)

(52) U.S. Cl.
CPC ......... *H04W 16/14* (2013.01); *H04J 11/0026* (2013.01); *H04W 4/021* (2013.01);
(Continued)

(58) Field of Classification Search
CPC ... H04L 5/0053; H04L 5/0062; H04L 5/0094; H04L 5/0067; H04L 5/0069;
(Continued)

(56) References Cited

U.S. PATENT DOCUMENTS

2012/0120887 A1* 5/2012 Deaton ................. H04W 16/14
370/329
2013/0336155 A1* 12/2013 Jantti .................... H04W 24/08
370/252
(Continued)

FOREIGN PATENT DOCUMENTS

WO    2013124524 A1    8/2013

OTHER PUBLICATIONS

International Preliminary Report on Patentability, PCT/IB2018/053709, dated Dec. 5, 2019, 7 pages.
(Continued)

*Primary Examiner* — Jean A Gelin
(74) *Attorney, Agent, or Firm* — Nicholson De Vos Webster & Elliott LLP (57) ABSTRACT

Methods and apparatus for protecting a dynamic protection area (DPA). In one embodiment, an electronic device detects that the DPA is activated in the vicinity of a location recorded within a geolocation database. The electronic device compares a threshold representing acceptable interference and an estimated aggregate interference by the set of CBSDs to a set of points within the DPA. The electronic device moderates transmission by one or more CBSDs within the set of CBSDs when the estimated aggregate interference is higher than what is acceptable to the DPA.

21 Claims, 7 Drawing Sheets

(51) Int. Cl.
  *H04W 72/08* (2009.01)
  *H04W 84/04* (2009.01)
(52) U.S. Cl.
  CPC ......... *H04W 16/10* (2013.01); *H04W 52/367* (2013.01); *H04W 72/0453* (2013.01); *H04W 72/082* (2013.01); *H04W 84/042* (2013.01)
(58) Field of Classification Search
  CPC .... H04L 5/0032; H04L 5/006; H04J 11/0026; H04W 4/021; H04W 52/367; H04W 72/0453; H04W 72/082; H04W 84/042; H04W 16/10; H04W 16/12; H04W 16/14; H04W 28/06; H04W 52/243; H04W 24/10; H04W 48/04; H04W 52/242; H04W 52/245; H04W 72/044; H04W 72/048
  See application file for complete search history.

(56) References Cited

U.S. PATENT DOCUMENTS

| | | | |
|---|---|---|---|
| 2013/0339353 A1* | 12/2013 | Emmelmann | G06F 16/29 707/736 |
| 2014/0031031 A1* | 1/2014 | Gauvreau | H04L 5/0053 455/426.1 |
| 2014/0269526 A1* | 9/2014 | Mitola, III | H04L 5/0037 370/329 |
| 2015/0163671 A1* | 6/2015 | Stanforth | H04W 16/14 455/411 |
| 2016/0212624 A1 | 7/2016 | Mueck et al. | |
| 2018/0063844 A1* | 3/2018 | Khoshnevisan | H04W 72/048 |
| 2018/0288620 A1* | 10/2018 | Jayawickrama | H04W 72/0453 |
| 2020/0059405 A1* | 2/2020 | Liu | H04W 68/005 |

OTHER PUBLICATIONS

Wireless Innovation Forum Contribution, "Federal Incumbent Protection through Dynamic Protection Areas (DPA)", WINNF-17-I-00144 v.2, Rebecca Dorch, ITS, Jun. 19, 2017, 8 pages.

International Search Report and Written Opinion, PCT/IB2018/053709, dated Sep. 5, 2018, 10 pages.

Office Action, EP App. No. 18734941.0, dated Dec. 22, 2020, 10 pages.

* cited by examiner

METHOD AND APPARATUS FOR DYNAMIC PROTECTION AREA (DPA) PROTECTION

CROSS-REFERENCE TO RELATED APPLICATIONS

This application is a National stage of International Application No. PCT/IB2018/053709, filed May 24, 2018, which claims priority to U.S. Provisional Application No. 62/510,280, filed May 24, 2017, which are hereby incorporated by reference.

TECHNICAL FIELD

The present application relates generally to shared spectrum for mobile cellular networks and, more particularly, to proposing methods and apparatus for dynamic protection area (DPA) interference protection as well as several options depending on desired computation level.

BACKGROUND ART

The advance of mobile cellular networks and the popularity of mobile devices combined with the constant growth in user throughput have created a huge demand for one resource: spectrum.

Spectrum management includes at least three approaches:
License the spectrum to operators, who will pay significant fees for the privilege of using dedicated spectrum;
Unlicensed spectrum where devices are sharing the same spectrum using a set of predetermined rules aimed at insuring fair spectrum access; and
Shared spectrum, e.g., Licensed Shared Access (LSA) or Authorized Shared access (ASA), usually proposing a division of rights of use, based on time of use or geographical constraints between mobile operators and possibly an incumbent user.

A typical use of the last approach using the shared spectrum is to enable use of a band that is available for licensed users in some markets, but is being restricted in others because of incumbents such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The creation in the United States of the new Citizens Broadband Radio Service (CBRS) in the 3.5 GHz band, currently occupied by incumbents like the Department of Defense (DoD), will add much-needed capacity to meet the ever-increasing demands of wireless innovation. The CBRS represents a more aggressive application of ASA to spectrum, where in addition to long-term geographic licenses shared with incumbents, multiple operators may also coexist in close geographical proximity to one another. A Citizens Broadband Radio Service Device (CBSD) may utilize CBRS in the 3.5 GHz (or other band with similar characteristics). A Dynamic Protection Area (DPA) is a predefined local protection area which may be activated or deactivated to protect a federal incumbent user. It is challenging to manage interferences generated by one or more CBSDs once a DPA is activated.

SUMMARY

The embodiments of the invention include methods and apparatus allowing a SAS to manage the interference generated by the CBSDs once a DPA has been activated. Several embodiments are specified to cover different levels of required computational complexity.

Proper federal incumbent protection is essential in enabling commercial deployments along the coastal regions which are densely populated. The proposed interference management algorithm maximizes the allowed output power of the impacted CBSDs in the neighborhood of the DPAs that have been activated.

DETAILED DESCRIPTION

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A wireless communication network (or simply wireless network) is a network of electronic devices communicating using radio waves (electromagnetic waves within the frequencies 30 KHz-300 GHz). A wireless communication may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire system, IEEE 802.11 systems.

A network device (ND) (also referred to as a node, the two terms are used interchangeably in this document) is an electronic device in a wireless communication network via which a terminal device accesses the network and receives services therefrom. One type of network devices may refer to a base station (BS), a radio station, or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell. Another type of network device is terminal devices that may access a wireless communication network and receive services from the wireless communication network. For example, a terminal device may be a user equipment (UE), which may be a subscriber station (SS), a portable subscriber Station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box.

Figure 1:
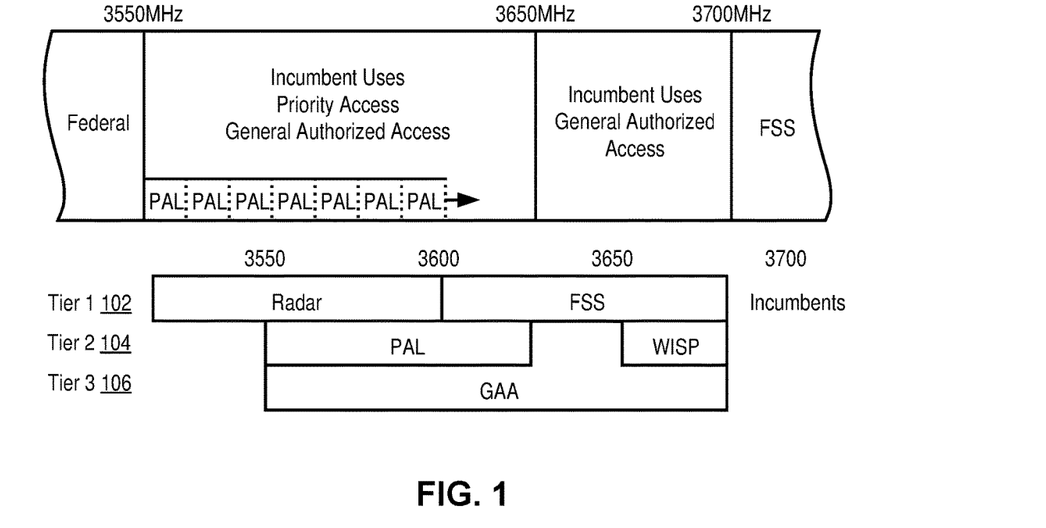
FIG. 1 illustrates spectrum anatomy for the 3.5 GHz citizens broadband radio service (CBRS).

FIG. 1 illustrates the spectrum anatomy for the 3.5 GHz (gigahertz) Citizens Broadband Radio Service. Sharing in the 3.5 GHz band occurs among multiple (e.g., three) tiers of users. Access to the spectrum is governed by a Spectrum Access System (SAS) that implements a geolocation database and policy management function to be used to protect incumbents as well as to implement a tiered access framework. An SAS may be implemented in an electronic device. Incumbent users represent the highest tier (Tier 1 at reference 102) in this framework and receive interference protection from Citizens Broadband Radio Service (CBRS) users. Protected incumbents include the federal operations such as radar, as well as Fixed Satellite Service (FSS) and, for a finite period, grandfathered terrestrial wireless operations in the 3650-3700 MHz (megahertz) portion of the band. The lower tiers (Tiers 2 and 3 at references 104 and 106 respectively) include the Citizens Broadband Radio Service (CBRS) itself, which consists of at least two tiers-Priority Access and General Authorized Access (GAA)-both authorized in any given location and frequency by an SAS. Tier 2 includes ones with Priority Access Licenses (PALs) and wireless Internet service providers (WISPs). As the name suggests, Priority Access operations receive protection from GAA operations. PALs, defined as an authorization to use a 10 MHz channel in a single census tract for three years, will be assigned in up to 70 MHz of the 3550-3650 MHz portion of the band. A census tract is a geographic region defined for the purpose of taking a census. GAA use will be allowed, by rule, throughout the 150 MHz band. GAA users will receive no interference protection from other Citizens Broadband Radio Service (CBRS) users. The band has been designed for deployment of small cells, although there is sufficient capability in the rules to provision wide area macro deployments as well.

A Citizens Broadband Radio Service Device (CBSD) will first register with SAS and provide its location information among other registration parameters, and then it will ask the SAS to grant access in a certain channel. Before granting access, SAS will use information from the Environmental Sensing Capability (ESC) network to detect incumbent activity in the area where CBSD operates. SAS will also use measurement reports from the other CBSDs in the same area to determine the level of interference in a certain channel as well as if the channel needs to be protected due to PAL user activity. In one embodiment, a CBSD is a radio station.

Figure 2:
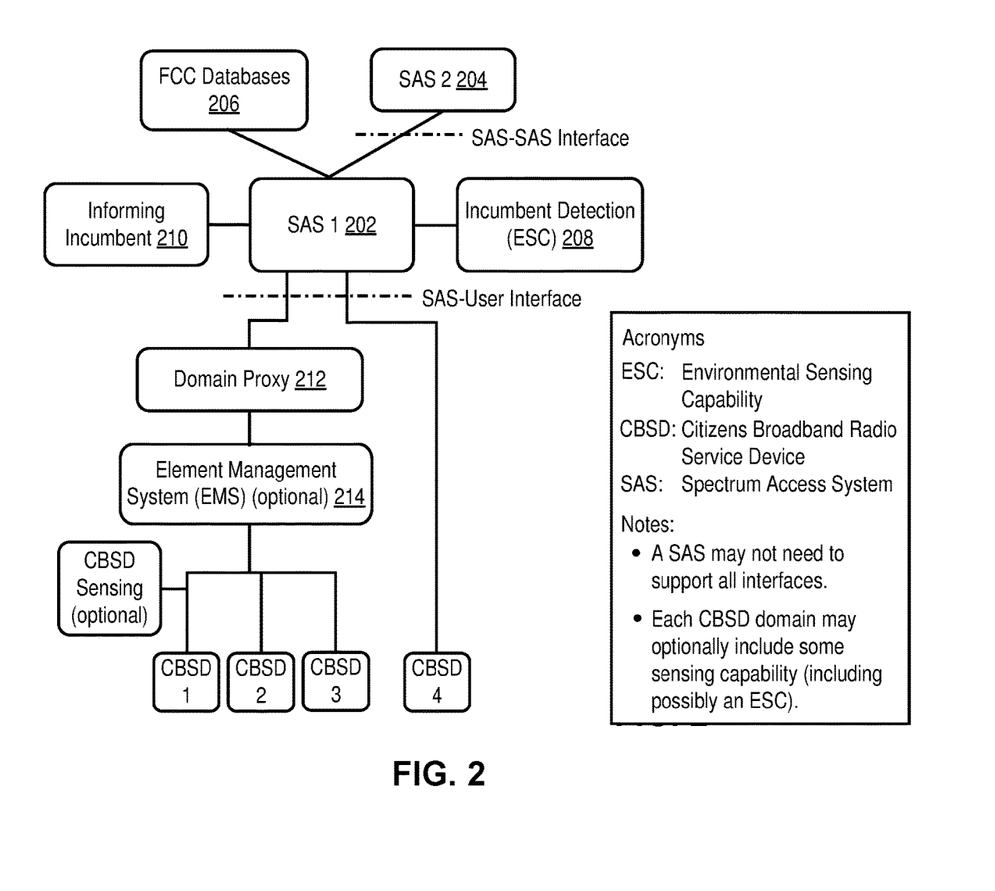
FIG. 2 illustrates a spectrum access system (SAS) Architecture.

FIG. 2 illustrates an SAS Architecture. The incumbent systems in the 3550-3700 MHz band include coastal and terrestrial radar, and FSS. The coastal regions are covered by the Environmental Sensing Component (ESC) made up of a set of sensors and a detection system that will detect the presence of radar from a distance of X-65 nautical miles (approximately 120 km) from the shoreline. A detection event will cause the SAS to reconfigure CBSDs placed within defined exclusion zones near the coastline. Reconfiguration includes termination of transmission rights for a CBSD, and also includes reduction of power or reallocation of new spectrum.

The band allows the establishment of 0-7 PALs for each of over 74000 census tracts in the United States as established in the 2010 census. The PALs will be associated with spectrum allocations by the SAS within the range 3550-3650 MHz and correspond to a 10 MHz assignment per license. The SAS will try to place multiple PALs adjacent to each other if so preferred by the CBSD.

A PAL user can protect a registered deployment of CBSDs within a PAL Protection Area (PPA) that is at most bounded by an area that is bounded by a contour representing a −96 dBm signal level. A PPA can overlap parts of multiple census tracts. While a PPA is atomically defined with respect to the coverage of a single CBSD, a composite PPA can be constructed by combining the coverage areas of geographically proximate CBSDs as shown in FIG. 3.

Figure 3:
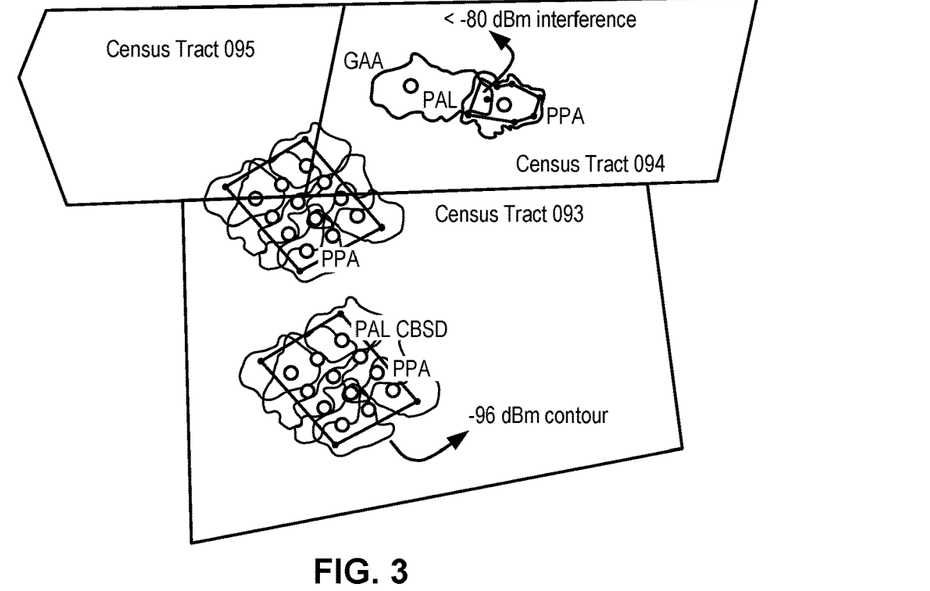
FIG. 3 illustrates a composite coverage of a priority access license (PAL) protection area (PPA) on a map.

FIG. 3 shows a simple PPA constructed as a set of vertices of a polygon (e.g., each vertex located as latitude, longitude and optionally an altitude above mean sea level or ground level). The PPA is restricted to lie within a coverage contour for the CBSD signal, a maximum coverage determined by the −96 dBm/10 MHz contour. All SASs are supposed to have a consistent methodology for determining coverage. The PPA is typically claimed by the CBSD towards the serving SAS and the SAS authorizes the PPA after validation of the claim against the PAL.

The SAS only protects the PAL to an aggregate interference level of −80 dBm. In the case of a Long-Term Evolution (LTE) deployment, this means that the usable coverage contour may be much smaller than the PPA, especially if the interference level is at the limit, and a CBSD may not be able to operate close to receiver sensitivity. A PAL is protected within the bounds of the PPA, but cochannel assignments to GAA users within the census tract are possible if the SAS can determine that the interference limits within the PPA will not be exceeded. Such frequency allocations may occur from several SASs, especially in census tracts within highly populated metropolitan areas.

Figure 4A:
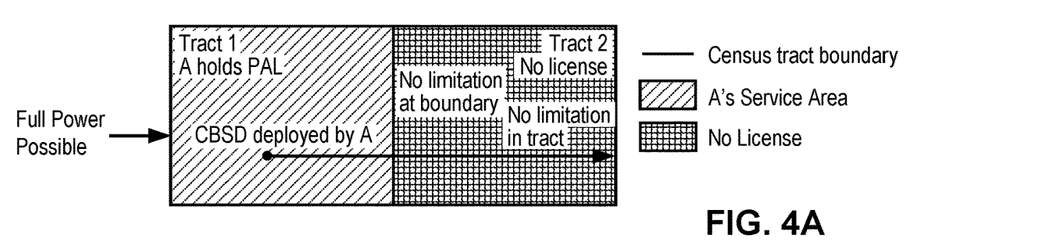
FIGS. 4A-C illustrate protection criteria for priority access license (PAL) based on power level.
Figure 4B:
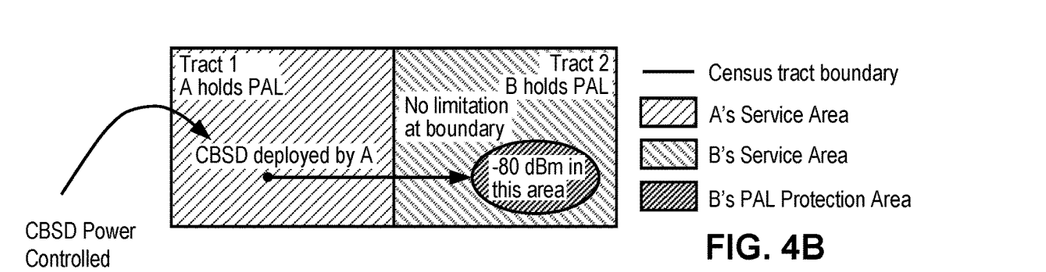
Figure 4C:
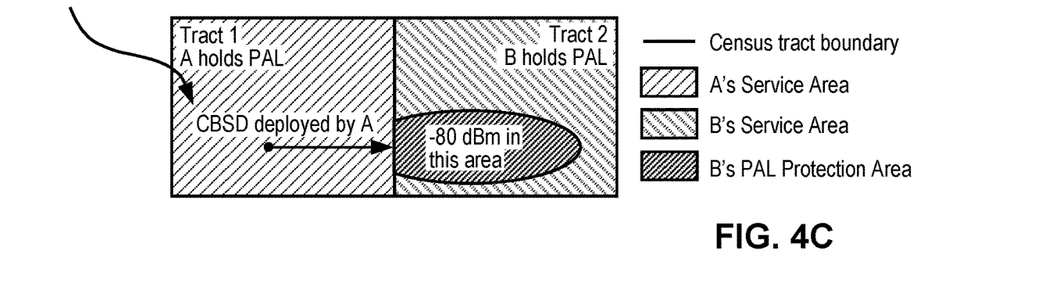

FIGS. 4A-C illustrate protection criteria for priority access license (PAL) based on power level. Two consensus tracts (Tracts 1 and 2) are next to each other. In FIG. 4A, when a CBSD is deployed by a user A that holds a PAL in Tract 1, and Tract 2 has no user that holds a PAL, the CBSD deployed by the user A may operate in full power and reach Tract 2. The CBSD's power reach is not limited by the tract boundary or limited within Tract 2. In FIG. 4B, a CBSD is deployed by the user A that holds a PAL in Tract 1, and another CBSD is deployed by the user B that holds a PAL. When the power transmission of the CBSD in Tract 1 is over −80 dBm upon reaching to the PAL Protection Area (PPA) of the CBSD in Tract 2, the CBSD deployed by the user A is power controlled. In other words, the power control is in affect regarding the PPA, not the tract boundary. In FIG. 4C, the PPA of the CBSD in Tract 2 is at the tract boundary. In that case, the CBSD in Tract 1 is power controlled when the power transmission of the CBSD in Tract 1 is over −80 dBm upon reaching the tract boundary between Tracts 1 and 2.

The Joint Working Group (JWG), which is a group of key federal stakeholders in the CBRS band (DoD, Federal Communications Commission (FCC), National Telecommunications and Information Administration (NTIA), Intelligent Transportation Systems (ITS)), has proposed using Dynamic Protection Areas (DPAs) for protecting incumbent radar operation near the coast of the United States.

According to the JWG proposal, a DPA is a predefined local protection area that may be activated or deactivated to protect a federal incumbent user. An activated DPA must be protected from aggregate CBSD interference.

A DPA is defined based on the following attributes:
Geographical Area to be protected. Described as coordinates of polygons defining the boundaries of the DPA. These polygons are predefined and fixed in location.
Incumbent Receivers Protection Criteria/Requirement.
Reference Receive Antenna Beam [e.g., 3 degrees main beamwidth with antenna gain −25 dBi mean side lobe level attenuation], Height [e.g., 50 meters], Elevation [e.g., 0 degrees], Azimuth [range, rotating and random beam positions].
Maximum Allowed Aggregate Interference Level [e.g., in to-be-determined dBm] with a reliability of [e.g., 95%].
Reliability is defined as the probability that aggregate interference from CBRS entities remains below the maximum allowed aggregate interference level for any protected point on and within the DPA.

Although DPA protection is somewhat similar to PPA protection, there are significant differences requiring customized algorithms for DPA protection.

Figure 5:
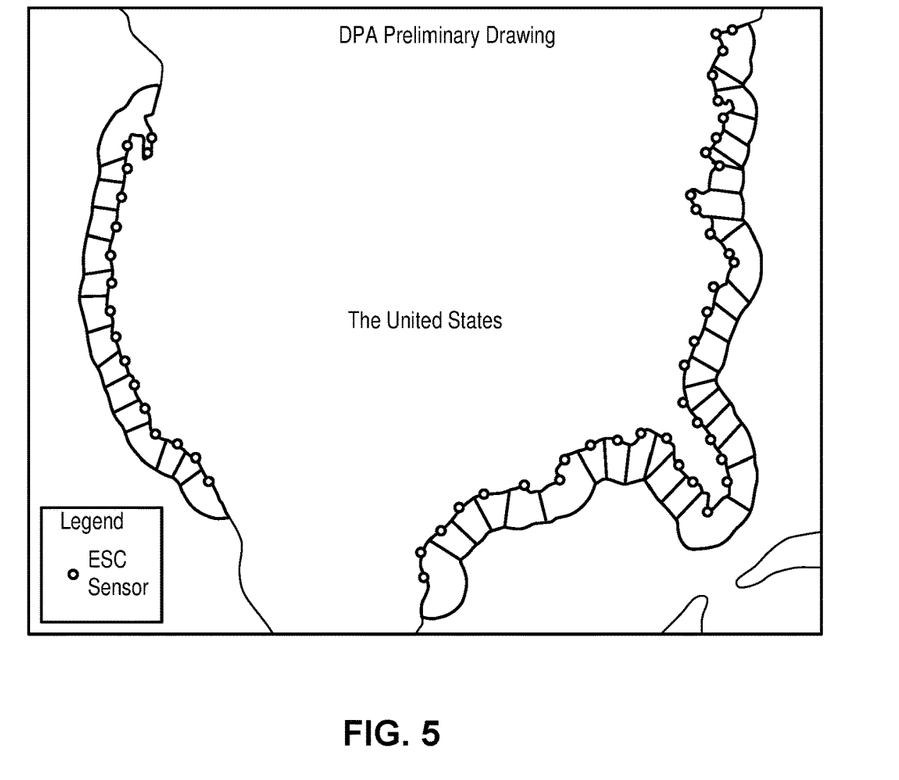
FIG. 5 illustrates a bird's-eye view of coastal DPAs of the United States.

FIG. 5 illustrates a bird's-eye view of coastal DPAs of the United States. The preliminary coastal DPAs are allocated along the coastline of the United States. A DPA is a polygonal area that is delineated off-shore along the US coastline. The polygon is meant to postulate possible positions of naval shipping, specifically vessels in littoral waters that operate radio location systems in the 3550-3650 MHz Band. The polygon is constructed to aid the Spectrum Access System (SAS) to evaluate the impact of CBSD transmissions to ship locations that are hypothesized at any location within the polygon.

Figure 6:
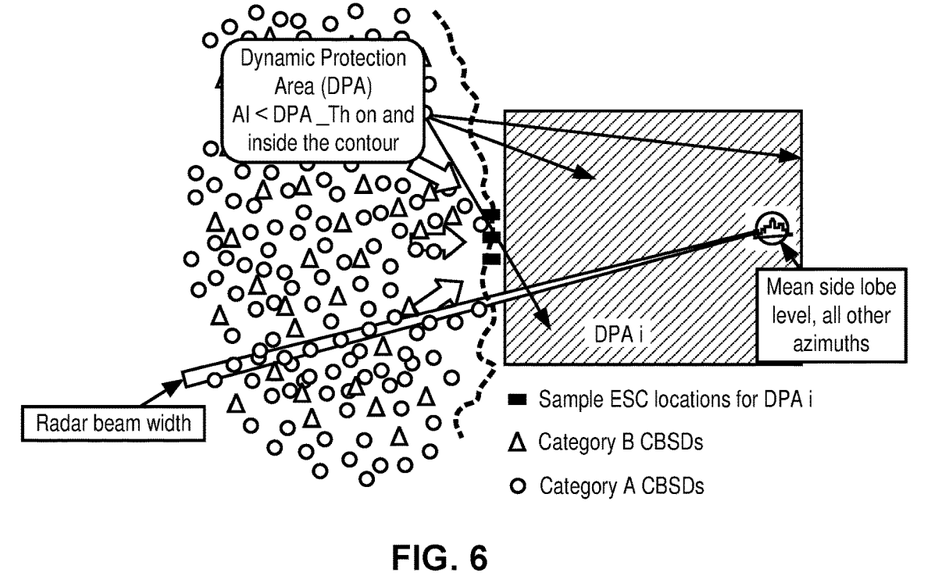
FIG. 6 illustrates a dynamic protection area

FIG. 6 illustrates a dynamic protection area. A vessel (e.g., an aircraft carrier) is within DPA i, and the main lobe of the beam from the vessel's antenna captures some fraction of the landscape, and may occasionally intercept one or more CBSDs in its boresight. These CBSDs are of two types, either Category A (Cat A) or Category B (Cat B).

The introduction of DPAs, for protecting federal incumbents, opens the possibility of eliminating the exclusion zones along the coasts and will enable deployments in those densely populated areas. However, SASes will have to manage the interference caused by CBSDs once a DPA has been activated.

Figure 7:
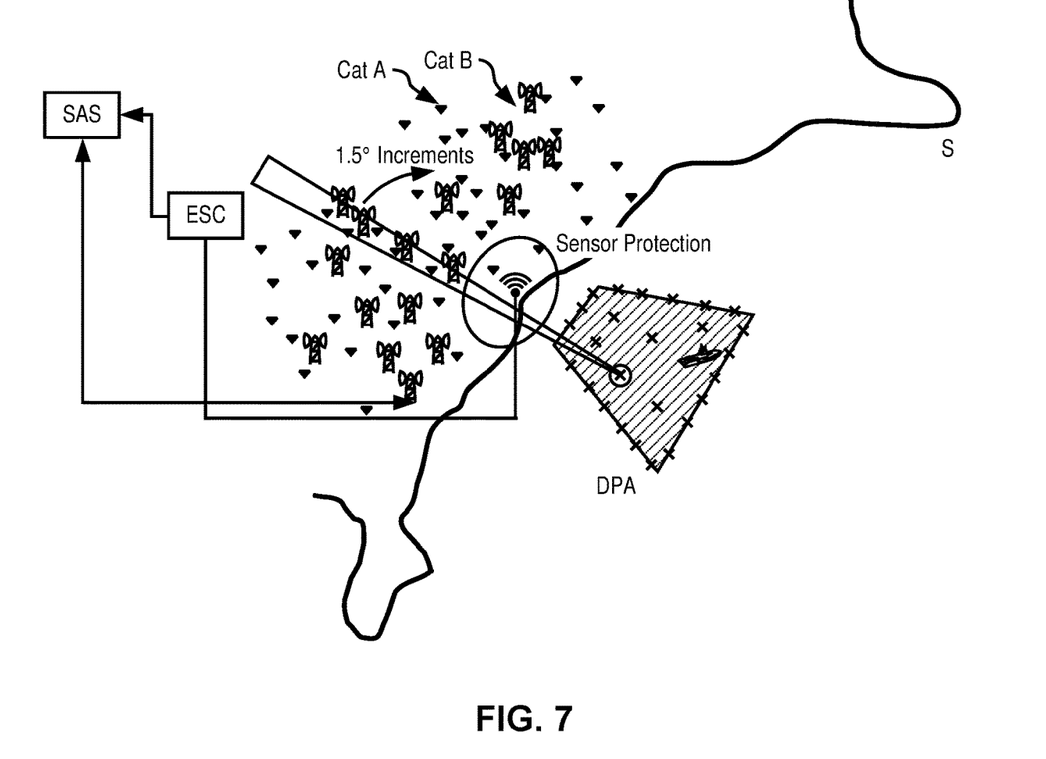
FIG. 7 illustrates activated DPA and its interaction with CBSDs per one embodiment of the invention.

It has been recognized that the predominant radar in use, an air marshalling radar operated from aircraft carriers known as the SPM/43C, uses a high gain antenna with Half-Power Beam Width (HPBW) of 3° and scans the beam across all 360° of azimuth. FIG. 7 illustrates activated DPA and its interaction with CBSDs per one embodiment of the invention. When an DPA is activated, the Environmental Sensing Component (ESC) is capable of detecting the radar transmissions, and reacts to the detection event by one or more sensors, detecting the activation of one or more DPA(s). The activation of the DPA is passed on to one or more SASs, each charged with reacting to the activation by moderating the transmissions of the CBSDs capable of interfering with any point on the surface of the ocean within the polygon defining the DPA. Moderation may be a reduction of power or could mean a reduction of power level.

A First Set of Embodiments: Moderation of CBSDs in Light of DPA Activation

In one embodiment, the moderation of the CBSDs in light of activation of a DPA may be implemented as the following.

The DPA is characterized by some number of points representing its bounds and typically extends from the shallow water or deep-water mark offshore out to a distance of 150-200 km from the shore. Typically, these points p would be on some uniform raster within the interior of the DPA. One possible simplification of the number of points considered limits the raster to regularly spaced points along the boundary of the polygon forming the DPA, say spaced at 1 km distance separation, with a small random sample of points defined in the interior (say 10 points). Let the CBSDs in some neighborhood of the shoreline S, number N. The number of CBSDs may be decided by some pragmatic artifice such as the CBSDs within the union of all areas extending for a radius R (of say 200 km) from each point p. The maximum distance considered may be assumed to be below some obvious radius, such as 200 km from the shoreline, or may also be prescribed to be specific distances from the shore for selecting DPAs where specific knowledge of the propagation characteristics of that terrain contradicts traditional modeling assumptions. Such selection of DPAs may further include DPAs that are adjoining or within the neighborhood of areas where radar systems are likely to be present, such as naval bases like Norfolk, Va.

Let the CBSDs selected for consideration in the aggregate interference calculation be enumerated by $c \in \{0, \ldots, N-1\}$. The DPA is characterized by a set of protection points $p_k$, $k \in \{0, \ldots, M-1\}$ that may be on a regular raster within its boundaries or an alternative raster as illustrated. Each CBSD's transmission is received at the protection point $p_k$ with received power given by $P_{R,c,k} = P_{T,c} L_{c,k}$, where $P_{T,c}$ is the power of CBSD c, and $L_{c,k}$ is the path loss (PL) on the propagation path from CBSD c to DPA sample point k. It should be understood that the term propagation path may be a derived measure based on a profile that considers many aspects of empirical modeling or measurement derived information; it is important that the loss or attenuation of the signal on the path is characterized as $L_{c,k}$. The beam pattern is quantized along the azimuth as $d \in \{0, \delta_1, 2\delta_1 \ldots, 360-\delta_1\}$ degrees, where the azimuth is with respect to an arbitrary and convenient reference angle; the increment $\delta_1$ (say 1° or 1.5°) is nominally chosen as an integer partitioning of the 360 degrees, or some fraction of 360° that adequately subtends the visible shoreline.

The hypothetical radar receiver gain $G_{c,k,d} \forall_{c,k,d}$ leads to a relationship for the interference contribution from CBSD c:

$$A(k, d) = \sum_{c=0}^{N-1} P_{r,c,k} G_{c,k,d}. \quad (1)$$

Let $A(k_j, d_u(k_j))$ be the subset of DPA points $k_j$ and angles $d_u(k_j)$ at each $k_j$ where $A(k_j, d_u(k_j)) > Q_{DPA}$, for an aggregate interference threshold of $Q_{DPA}$.

(*) Let $\alpha_{d_u,k_j} G_{c,k_j,d_u(k_j)}$ be calculated so that $\alpha^\dagger = \max_{d_u,k_j} \alpha_{d_u,k_j}$ is the maximum of all minimum scalar attenuation factors $\alpha_{d_u, k_j}$ proportional to the receiver antenna pattern in the offending direction $d_u(k_j)$ that reduces each $$A(k_j, d_u(k_j)) < Q_{DPA} \quad (2)$$

A variety of alternatives are possible for the last step (*):
1. The entire set of CBSDs may be modulated by the overall gain pattern of the radar receiver antenna pattern.
2. In the event that this results in a large computational burden for the SAS, the CBSDs that are intersected by the main beam of the radar receiver (within the HPBW or some factor or the HPBW that admits more CBSDs on neighboring sides of the sector) may be utilized for every computation.
3. The computation may proceed incrementally, subtracting the gain contributions of prior CBSDs not under consideration for the new step, and adding in the contributions of new CBSDs that will be integrated towards the current step in azimuthal direction.
4. The factor $\alpha_{d_u, k_j}$ may be chosen so that all the CBSDs in a particular direction that are within the boresight of the antenna for a particular direction are turned off, thus increasing the chances of meeting the aggregate interference requirement.
5. The factor $\alpha^\dagger$ may be reduced along the radial direction in the optimization performed in step (*) earlier so that the attenuation is higher for CBSDs placed closer to the shoreline.

Lastly, it is possible that the terrain has significant multipath and the choice of directions to moderate CBSDs alone does not yield a solution that reduces the aggregate interference to the desired extent. In such a case, all CBSDs at successive radial distances from the set of protection points where specific angular directions result in aggregate interference higher than the threshold may be moderated in power or shut down.

Two specific embodiments are devised in what follows to illustrate specific alternatives.

A Second Set of Embodiments: CBSD Fair Interference Quota

Another approach is to estimate a fair interference quota that a CBSD is allowed to generate towards an activated DPA and then calculate the power reduction required for the CBSD to meet its interference quota.

Let $I_{CBSD}$ be the interference level from a CBSD towards the DPA. For fairness reasons, we assume all CBSD are generating the same interference level towards the DPA.

Let $Q_{DPA}$ be the interference threshold allowed for each sample point of the DPA.

Let N be the number of the devices that are impacting the DPA.

If the Radar antenna would be a regular omni antenna, then the cumulative interference would have to satisfy the following:

$$N^* I_{CBSD} <= Q_{DPA} => I_{CBSD} <= \frac{Q_{DPA}}{N} \quad (3)$$

However, when the radar beam width is 3°, with −25 dBi mean side lobe level attenuation, the above formula (3) may be too conservative.

Let $N_B$ be the number of CBSDs inside the beam.

Let AF be the attenuation factor for the CBSD devices outside the beam. For −25 dBi attenuation, that attenuation factor is AF=1/316=0.00316.

The cumulative interference would have to satisfy:

$$\sum (I_{CBSD\,inside\,beam}) + \sum (I_{CBSD\,outside\,beam}) <= \quad (4)$$

$$Q_{DPA} => N_B^* I_{CBSD} + AF^*(N-N_B)^* I_{CBSD} <=$$

$$Q_{DPA} => I_{CBSD} <= \frac{Q_{DPA}}{(N_B + AF*(N-N_B))}$$

The cumulative interference formula above must be satisfied for all the possible beams.

Let $N_{Bmax}$ be the maximum number of CBSDs inside any beam (i.e., $N_{Bmax}$ is the maximum nr of CBSDs captured by a beam instance as it sweeps across the land). Then, the cumulative interference will satisfy:

$$I_{CBSD} <= \frac{Q_{DPA}}{(N_{Bmax} + AF*(N-N_{Bmax}))} \quad (5)$$

The formula above gives the fair interference quota that each CBSD can generate towards the DPA. The CBSDs that generate higher interference level must reduce their output power in order to protect the DPA. In case a CBSD impacts several activated DPA, the CBSD has to reduce its output power in order to satisfy the each active DPA quota.

The limits of the interference quota are:

Upper limit, (6)

when $N_{Bmax} = 1 => I_{CBSDmax} <= \frac{Q_{DPA}}{(1 + AF*(N-1))}$

Lower limit, when $N_{Bmax} = N => I_{CBSDmax} <= \frac{Q_{DPA}}{N}$

The upper limit is achieved when all the CBSDs are deployed in a line parallel to the coast line and there is a maximum of one CBSD in every beam instance. The lower limit is achieved when all the CBSDs are deployed in a line perpendicular on the coast line and all the CBSDs are captured inside a beam.

Figure 8:
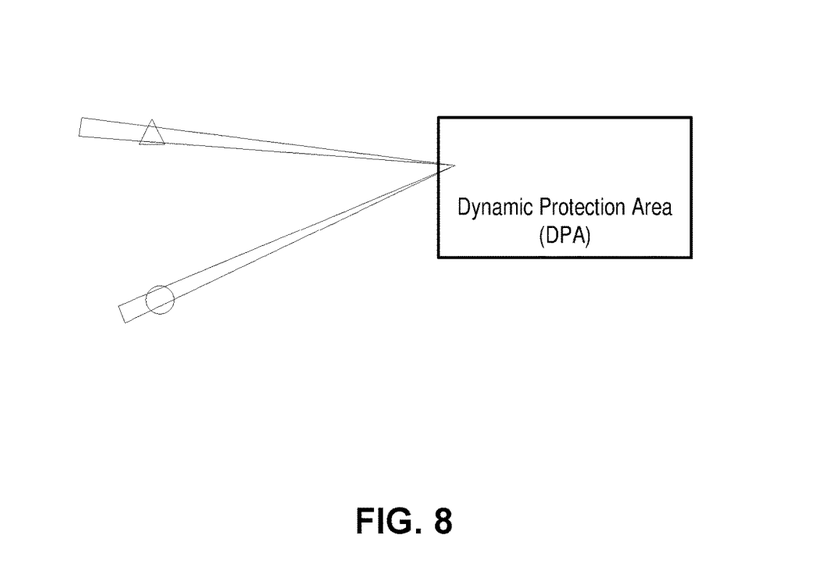
FIG. 8 illustrates CBSDs being deployed in a line parallel to the coast line per one embodiment of the invention.
Figure 9:
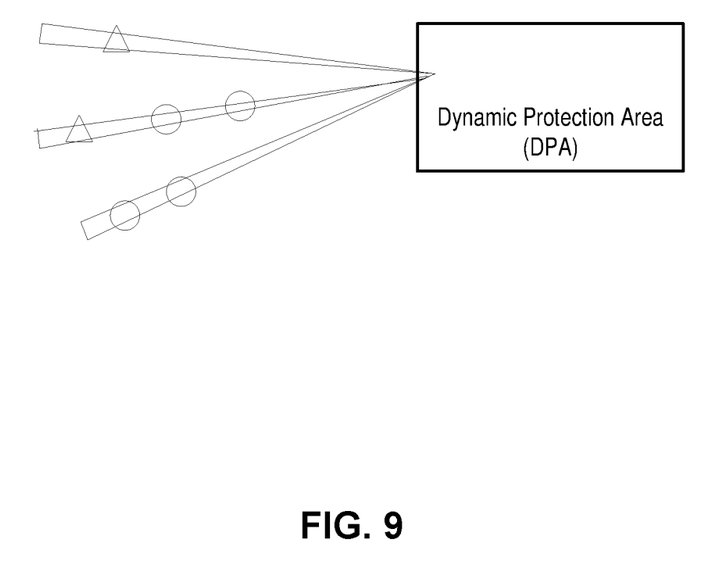
FIG. 9 illustrates CBSD being deployed spread out and some in a line parallel to and other in a line perpendicular on the coastline per one embodiment of the invention.
Figure 10:
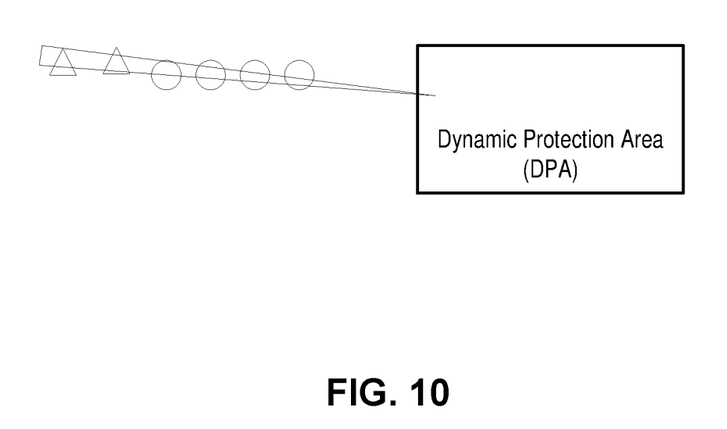
FIG. 10 illustrates CBSD being deployed in a line perpendicular on the coastline per one embodiment of the invention.

Some examples are illustrated in FIGS. 8-10. FIG. 8 illustrates CBSDs being deployed in a line parallel to the coast line per one embodiment of the invention.

$$N = 2, N_{Bmax} = 1, AF = 0.00316 \quad (7)$$

$$I_{CBSD} <= \frac{Q_{DPA}}{1.00316}$$

The interference quote reaches its upper limit.

FIG. 9 illustrates CBSD being deployed spread out and some in a line parallel to and other in a line perpendicular on the coastline per one embodiment of the invention.

$$N = 6, N_{Bmax} = 3, AF = 0.00316$$

$$I_{CBSD} <= \frac{Q_{DPA}}{3.0948}$$

FIG. 10 illustrates CBSD being deployed in a line perpendicular on the coastline per one embodiment of the invention.

$$N = 6, N_{Bmax} = 6, AF = 0.00316 \quad (8)$$

$$I_{CBSD} <= \frac{Q_{DPA}}{6}$$

A Third Set of Embodiments: DPA Protection Using an Iterative Allocation Process (IAP) Algorithm to Pre-Compute the maxAllowedEIRP The Wireless Innovation Forum (WInnForum) (see WINNF-17-I-00144 Federal Incumbent Protection through DPAs-JWG Input on Technical Requirements, WINNF-17-I-00144) defines, in requirement R2-SGN-16, an IAP for Interference Margin Allocation.

A similar approach can be used for DPA protection. First IAP is run for other protected entities (PEs) to determine the allowed power level for CBSD grants. Then IAP is run for each DPA to determine the maximum Allowed equivalent isotropic radiated power (EIRP) if the DPA would be activated. An EIRP is the measured radiated power of an antenna in a specific direction. It is also called Effective Isotropic Radiated Power. It is the output power when a signal is concentrated into a smaller area by the Antenna. The EIRP is represented in dB and it can take into account the losses in transmission line, connectors and includes the gain of the antenna in one embodiment.

When protecting a point inside the DPA, the IAP algorithm will be modified with the new formula for interference quota per CBSD:

$$I_{CBSD} <= \frac{Q_{DPA}}{(N_{Bmax} + AF*(N-N_{Bmax}))} \quad (9)$$

The max output power for each CBSD, maxAllowedEIRP$_{cbsd,dpa,ch}$, will be computed using IAP for each DPA. When a DPA is activated in channel ch, then the grant power is lowered to maxAllowedEIRP$_{cbsd,dpa,ch}$. If several DPAs are activated in channel ch, the grant output power is lowered to: MIN(maxAllowedEIRP$_{cbsd,dpai,ch}$), where dpa$_i$ is an active DPA in channel ch.

A Fourth Set of Embodiments: DPA Protection Using Constraining Factors

A simplified constraining factor approach can be used when lower computation complexity is required.

A Constraining Factor (CF) is a number, expressed in dB, that shows how much the output power of a CBSD grant has to be reduced in order to protect a DPA when it is activated.

For each CBSD cbsd and DPA dpa on channel ch:

$$CF_{cbsd,dpa,ch} = \text{maxEIRP}_{cbsd,ch} - \text{maxAllowed-EIRP}_{cbsd,dpa,ch}$$

To compute the CF:
Compute the interference $I_{cbsd,dpa,ch} = \text{maxEIRP}_{cbsd,ch} - PL_{cbsd,dpa,ch}$ from CBSD cbsd towards DPA dpa active in channel ch
If $I_{cbsd,dpa,ch} \leq (Q_{dpa}/(N_{Bmax}+AF*(N-N_{Bmax}))) \Rightarrow CF_{cbsd,dpa,ch}=0$,
otherwise $$CF_{cbsd,dpa,ch} = I_{cbsd,dpa,ch} - (Q_{dpa}/(N_{Bmax}+AF*(N-N_{Bmax}))) \quad (10)$$

All CBSDs with constraining factor greater than 0 will have the grant suspended when the DPA is activated. Constraining factors can be pre-calculated and can be used once a DPA is activated. CF must be recalculated when new CBSDs are added.

A Fifth Set of Embodiments: DPA Protection Using Generalized Constraining Factors A generalized constraining factor approach can be used when consideration of both the lower and upper limits on the interference is desired.

A Constraining Factor (CF) is a number, expressed in dB, that shows how much the output power of a CBSD grant has to be reduced in order to protect a DPA when it is activated.

For each CBSD cbsd and DPA dpa on channel ch:

$$CF_{cbsd,dpa,ch} = \text{MaxEIRP}_{cbsd,ch} - \text{maxAllowed-EIRP}_{cbsd,dpa,ch} \quad (11)$$

To compute the CF:
Compute the interference $I_{cbsd,dpa,ch} = \text{maxEIRP}_{cbsd,ch} - PL_{cbsd,dpa,ch}$ from CBSD cbsd towards DPA dpa active in channel ch
If $I_{cbsd,dpa,ch} \leq \alpha\ (Q_{dpa}/(N_{Bmax}+AF*(N-N_{Bmax})))+(1-\alpha) Q_{dpa}/N \Rightarrow CF_{cbsd,dpa,ch}=0$,
otherwise $$CF_{cbsd,dpa,ch} = I_{cbsd,dpa,ch} - (\alpha(Q_{dpa}/(N_{Bmax}+AF*(N-N_{Bmax})))+(1-\alpha)Q_{dpa}/N) \quad (12)$$

in which α is a weighting between 0 and 1.

All CBSDs with constraining factor greater than 0 will have the grant suspended when the DPA is activated. Constraining factors can be pre-calculated and can be used once a DPA is activated. CF must be recalculated when new CBSDs are added.

Exemplary Deployments

Figure 11:
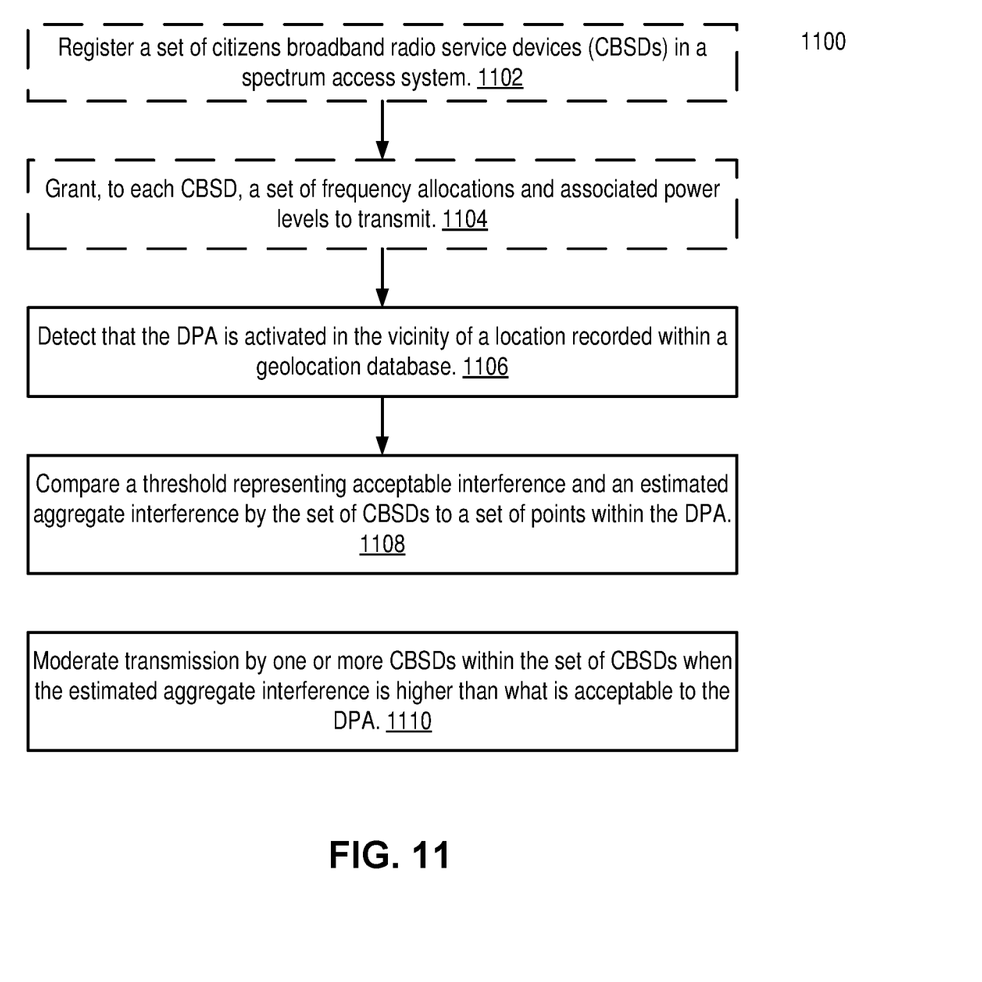
FIG. 11 is a flow diagram illustrating operations for dynamic protection area (DPA) protection per one embodiment of the invention.

FIG. 11 is a flow diagram illustrating operations for dynamic protection area (DPA) protection per one embodiment of the invention. The operations are performed by an electronic device that protects a dynamic protection area (DPA) adjoining one or more wireless networks. The wireless network includes a set of citizens broadband radio service devices (CBSDs). In one embodiment, the electronic device comprises a spectrum access system (SAS). The spectrum access system serves a citizen broadband radio service (CBRS), wherein the spectrum access system includes a geolocation database in one embodiment.

At reference 1102, a set of citizens broadband radio service devices (CBSDs) is registered in the spectrum access system (SAS). Then at reference 1104, each CBSD is granted a set of frequency allocations, an associated antenna pattern, and associated power levels to transmit.

At reference 1106, the electronic device detects that the DPA is activated in the vicinity of a location recorded within a geolocation database. The location is at a coastal region in one embodiment.

At reference 1108, the electronic device compares a threshold representing acceptable interference and an estimated aggregate interference by the set of CBSDs to a set of points within the DPA. The comparison may utilize formulas 1-12 discussed herein above. In one embodiment, the set of points comprises regularly spaced points along the boundary of a polygon forming the DPA and a number of randomly selected points within the DPA interior.

In one embodiment, the estimated aggregate interference is determined by calculating a received power level at each of the set of points based on transmission from each of the set of CBSDs and determining the estimated aggregate interference based on the received power levels and respective radar receiver gains at each of the set of points.

In one embodiment, the one or more CBSDs within the set of CBSDs are CBSDs that are intersected by the main beam of a radar receiver within the DPA.

In one embodiment, the one or more CBSDs within the set of CBSDs are CBSDs that are intersected in an azimuthal direction from any of the set of points.

In one embodiment, the estimated aggregate interference is further based on an attenuation factor for CBSDs in a direction that is within boresight of an antenna are set so that transmission by the CBSDs in the direction are moderated.

In one embodiment, the estimated aggregate interference is further based on an attenuation factor for CBSDs that are closer to a shoreline of a coastal region along a radial direction are set higher than others that are further away.

In one embodiment, the one or more CBSDs whose transmission are moderated are the ones at successive radial distances from the set of points an azimuthal direction, wherein the interferences of the one or more CBSDs are higher than a threshold.

In one embodiment, the threshold is an interference quota threshold that is based on an attenuation factor, and a number of CBSDs within the main beam of a radar within the DPA. The one or more CBSDs whose transmission are moderated are the ones that the respective interference quota is over the interference quota threshold.

In one embodiment, the number of CBSDs within the main beam of the radar within the DPA is the maximum number of CBSDs within all beam instances when the radar sweeps across the location.

In one embodiment, the threshold is a maximum allowed equivalent isotropic radiated power (EIRP) for a CBSD, and wherein the one or more CBSDs whose transmission are moderated are the ones that the respective output power is over the maximum allowed EIRP.

In one embodiment, the estimated aggregate interference by a CBSD is measured by a constraining factor, value of which over zero causes moderating the CBSD.

In one embodiment, the constraining factor is based on a number of CBSDs within and outside of the main beam of a radar within the DPA.

At reference 1110, the electronic device moderates transmission by one or more CBSDs within the set of CBSDs when the estimated aggregate interference is higher than what is acceptable to the DPA.

In one embodiment, the moderation of the transmission by the one or more CBSDs includes at least one of the following: terminating transmission right of the one or more CBSDs; reducing transmission power of the one or more CBSDs; updating an associated antenna pattern for the CBSD; and updating a spectrum used by the one or more CBSDs to reduce interference.

Figure 12:
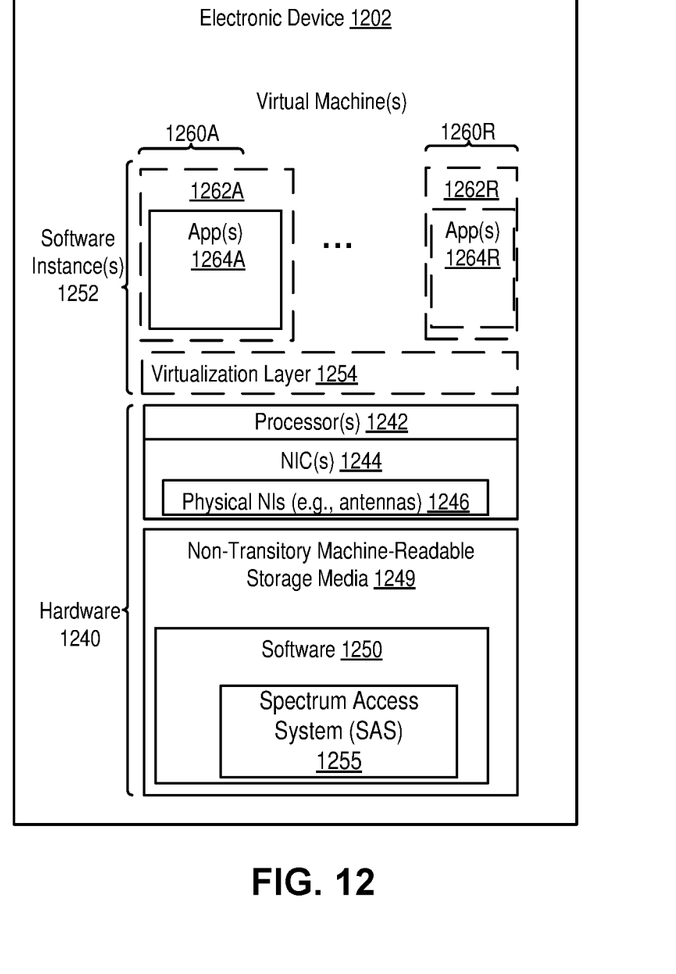
FIG. 12 illustrates an electronic device per one embodiment of the invention.

FIG. 12 illustrates an electronic device per one embodiment of the invention. The electronic device may be implemented using custom application-specific integrated-circuits (ASICs) as processors and a special-purpose operating system (OS), or common off-the-shelf (COTS) processors and a standard OS.

The electronic device 1202 includes hardware 1240 comprising a set of one or more processors 1242 (which are typically COTS processors or processor cores or ASICs) and physical NIs 1246, as well as non-transitory machine-readable storage media 1249 having stored therein software 1250. During operation, the one or more processors 1242 may execute the software 1250 to instantiate one or more sets of one or more applications 1264A-R. While one embodiment does not implement virtualization, alternative embodiments may use different forms of virtualization. For example, in one such alternative embodiment the virtualization layer 1254 represents the kernel of an operating system (or a shim executing on a base operating system) that allows for the creation of multiple instances 1262A-R called software containers that may each be used to execute one (or more) of the sets of applications 1264A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 1254 represents a hypervisor (sometimes referred to as a virtual machine monitor (VMM)) or a hypervisor executing on top of a host operating system, and each of the sets of applications 1264A-R run on top of a guest operating system within an instance 1262A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1240, directly on a hypervisor (in which case the unikernel is sometimes described as running within a LibOS virtual machine), or in a software container, embodiments can be implemented fully with unikernels running directly on a hypervisor represented by virtualization layer 1254, unikernels running within software containers represented by instances 1262A-R, or as a combination of unikernels and the above-described techniques (e.g., unikernels and virtual machines both run directly on a hypervisor, unikernels and sets of applications that are run in different software containers).

The software 1250 contains a spectrum access system 1255. The spectrum access system 1255 may include a geolocation database and a policy management function as discussed herein above. The spectrum access system may perform operations in the one or more of exemplary sets of embodiments sets one to five, described herein above. The instantiation of the one or more sets of one or more applications 1264A-R, as well as virtualization if implemented, are collectively referred to as software instance(s) 1252. Each set of applications 1264A-R, corresponding virtualization construct (e.g., instance 1262A-R) if implemented, and that part of the hardware 1240 that executes them (be it hardware dedicated to that execution and/or time slices of hardware temporally shared), forms a separate virtual electronic device 1260A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 1246 may include one or more antenna of the electronic device 1202. An antenna port may or may not correspond to a physical antenna.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

What is claimed is:

1. A method implemented in an electronic device to protect a dynamic protection area (DPA) adjoining one or more wireless networks, the method comprising:
   detecting, by the electronic device, that the DPA is activated in the vicinity of a location recorded within a geolocation database;
   comparing, by the electronic device, a threshold representing acceptable interference and an estimated aggregate interference by a set of citizens broadband radio service devices (CBSDs) to a set of points within the DPA, wherein the set of points comprises regularly spaced points along the boundary of a polygon forming the DPA and a number of randomly selected points within the DPA interior, wherein each CBSD operates at a frequency band between 3550 MHz to 3700 MHz, and wherein the estimated aggregate interference to a point of the set of points is measured at the point within the DPA; and
   moderating, by the electronic device, transmission by one or more CBSDs within the set of CBSDs when the estimated aggregate interference is higher than what is acceptable to the DPA.

2. The method of claim 1, wherein the electronic device comprises a spectrum access system serving a citizen broadband radio service (CBRS), and wherein the spectrum access system includes the geolocation database.

3. The method of claim 2, further comprising:
   registering the set of citizens broadband radio service devices (CBSDs) in the spectrum access system; and
   granting, to each CBSD, a set of frequency allocations, an associated antenna pattern, and associated power levels to transmit.

4. The method of claim 1, wherein moderating the transmission by the one or more CBSDs includes at least one of:
   terminating transmission right of the one or more CBSDs;
   reducing transmission power of the one or more CBSDs;
   updating an associated antenna pattern for the CBSD; and
   updating a spectrum used by the one or more CBSDs to reduce interference.

5. The method of claim 1, wherein the estimated aggregate interference is determined by:
   calculating a received power level at each of the set of points based on transmission from each of the set of CBSDs; and
   determining the estimated aggregate interference based on the received power levels and respective radar receiver gains at each of the set of points.

6. The method of claim 5, wherein the one or more CBSDs within the set of CBSDs are CBSDs that are intersected by the main beam of a radar receiver within the DPA.

7. The method of claim 5, wherein the one or more CBSDs within the set of CBSDs are CBSDs that are intersected in an azimuthal direction from any of the set of points.

8. The method of claim 5, wherein the estimated aggregate interference is further based on an attenuation factor for CBSDs in a direction that is within boresight of an antenna are set so that transmission by the CBSDs in the direction are moderated.

9. The method of claim 5, wherein the estimated aggregate interference is further based on an attenuation factor for CBSDs that are closer to a shoreline of a coastal region along a radial direction are set higher than others that are further away.

10. The method of claim 1, wherein the one or more CBSDs whose transmission are moderated are the ones at successive radial distances from the set of points an azimuthal direction, and wherein the interferences of the one or more CBSDs are higher than a threshold.

11. The method of claim 1, wherein the threshold is an interference quota threshold that is based on an attenuation factor, and a number of CBSDs within the main beam of a radar within the DPA, and wherein the one or more CBSDs whose transmission are moderated are the ones that the respective interference quota is over the interference quota threshold.

12. The method of claim 11, wherein the number of CBSDs within the main beam of the radar within the DPA is the maximum number of CBSDs within all beam instances when the radar sweeps across the location.

13. The method of claim 1, wherein the threshold is a maximum allowed equivalent isotropic radiated power (EIRP) for a CBSD, and wherein the one or more CBSDs whose transmission are moderated are the ones whose respective output power is over the maximum allowed EIRP.

14. The method of claim 1, wherein the estimated aggregate interference by a CBSD is measured by a constraining factor, value of which over zero causing moderating the CBSD.

15. The method of claim 14, wherein the constraining factor is based on a number of CBSDs within and outside of the main beam of a radar within the DPA.

16. An electronic device to protect a dynamic protection area (DPA) adjoining one or more wireless networks, the electronic device comprising:
   a processor and non-transitory computer-readable storage medium containing instructions, which when executed by the processor, cause the electronic device to perform:
   detecting that the DPA is activated in the vicinity of a location recorded within a geolocation database;
   comparing a threshold representing acceptable interference and an estimated aggregate interference by a set of citizens broadband radio service devices (CBSDs) to a set of points within the DPA, wherein each CBSD operates at a frequency band between 3550 MHz to 3700 MHz, and wherein the estimated aggregate interference to a point of the set of points is measured at the point within the DPA; and
   moderating transmission by one or more CBSDs within the set of CBSDs when the estimated aggregate interference is higher than what is acceptable to the DPA, wherein the one or more CBSDs whose transmission are moderated are the ones at successive radial distances from the set of points an azimuthal direction, and wherein the interferences of the one or more CBSDs are higher than a threshold.

17. The electronic device of claim 16, wherein the estimated aggregate interference is determined by:
   calculating a received power level at each of the set of points based on transmission from each of the set of CBSDs; and
   determining the estimated aggregate interference based on the received power levels and respective radar receiver gains at each of the set of points.

18. The electronic device of claim 16, wherein the threshold is an interference quota threshold that is based on an attenuation factor, and a number of CBSDs within the main beam of a radar within the DPA, and wherein the one or more CBSDs whose transmission are moderated are the ones that the respective interference quota is over the interference quota threshold.

19. The electronic device of claim 16, wherein the threshold is a maximum allowed equivalent isotropic radiated power (EIRP) for a CBSD, and wherein the one or more CBSDs whose transmission are moderated are the ones whose respective output power is over the maximum allowed EIRP.

20. An electronic device to protect a dynamic protection area (DPA) adjoining one or more wireless networks, the electronic device comprising:
  a processor and non-transitory computer-readable storage medium containing instructions, which when executed by the processor, cause the electronic device to perform:
    detecting that the DPA is activated in the vicinity of a location recorded within a geolocation database;
    comparing a threshold representing acceptable interference and an estimated aggregate interference by a set of citizens broadband radio service devices (CBSDs) to a set of points within the DPA, wherein each CBSD operates at a frequency band between 3550 MHz to 3700 MHz, and wherein the estimated aggregate interference to a point of the set of points is measured at the point within the DPA, wherein the estimated aggregate interference is determined by:
      calculating a received power level at each of the set of points based on transmission from each of the set of CBSDs; and
      determining the estimated aggregate interference based on the received power levels and respective radar receiver gains at each of the set of points; and
    moderating transmission by one or more CBSDs within the set of CBSDs when the estimated aggregate interference is higher than what is acceptable to the DPA.

21. The electronic device of claim 20, wherein the electronic device comprises a spectrum access system serving a citizen broadband radio service (CBRS), and wherein the spectrum access system includes the geolocation database.

* * * * *